3,801,481
METHOD FOR PURIFYING THE LIQUOR OF
A GALVANIZING PROCESS PLANT AFTER
CONTAMINATION
William L. Eddleman, Beaumont, Tex., assignor to David
B. Dean and Douglas B. Hayden, Jr., fractional part
interest to each
No Drawing. Filed Apr. 21, 1972, Ser. No. 246,186
Int. Cl. C02c 5/12
U.S. Cl. 204—149                                    8 Claims

ABSTRACT OF THE DISCLOSURE

A method of purifying a galvanizing and/or metal cleaning plant pickle liquor to permit re-use, which includes the steps of placing a cathode and an anode in the liquor and passing a DC current therethrough. Nacent iron and other metal molecules are recovered by means of a magnet in the near vicinity of the cathode. Iron oxides and other metallic salts are formed in the near vicinity of the anode which are insoluble in the liquor, and which can be subsequently removed by filtration.

PRIOR ART 2,428,221; 2,758,944; 3,575,711; 3,470,022; 3,310,425; 3,443,991; 3,445,284; 3,423,240; 3,427,198; 3,385,734; 2,359,088; 2,798,802; 3,592,212; 2,668,130; 3,466,288; 2,171,981; 2,405,592; and 1,146,071.

BACKGROUND OF THE INVENTION

In galvanizing plants, a vessel is charged with an acid having a pH of about one. Typically sulfuric acid is used, though hydrochloric acid can be used. The vessel or container is heated to raise the temperature to a point just short of boiling. Metal sheets and plates are dipped therein to clean dirt and scale therefrom. The plates may be dipped again after improper galvanizing to clean the surface of the zinc coated plates. After a period of time, the vessel contains a substantial amount of dirt, contamination, and various quantities of metal ions. The metal ions typically include iron and traces of metal elements such as manganese, copper, chromium, lead, tin, molybdenum titanium, nickel, strontium and zinc. Other trace elements may also be found in the acid bath after the cleaning of metals.

The acid bath is quite effective when the acid is first placed in the vessel. However, after a period of time and use, the acid bath loses some of its effectiveness. The rate at which the acid bath becomes unusable is dependent on many variables, including the relative size of the vessel, rate at which it is used, degree of contamination on the plates dipped in the bath, and many other factors. Eventually the acid bath becomes quite contaminated, and galvanizing suffers in quality. When the acid is contaminated, the effectiveness of the bath is reduced and it may fail in its intended purpose.

When the liquor in a vessel has been contaminated to an extent that it can no longer be used, it is preferably replaced. There is a great deal of difficulty in disposing of a substantial amount of strong acid. The present invention provides a means whereby the liquor can be purified, permitting the acid to be re-used, and as a consequence, the cost of galvanizing is reduced and the pollution of sewage and surface water is eliminated. The present invention is directed to a method for purifying the pickle liquor recovered from a galvanizing or metal cleaning plant to permit its subsequent re-use.

SUMMARY OF THE INVENTION

The method of the present invention is a method of purifying the pickle liquor of a galvanizing or metal cleaning plant. The method contemplates placing an anode and a cathode in the pickle liquor. A DC current is passed through the terminals and the bath. Elemental metals can be recovered in the vicinity of the cathode by the use of an electromagnet at or above the surface of the pickle liquor. These materials attach to the cathode momentarily, but do not plate thereon as that term is ordinarily understood in the art. The current flow through the pickle liquor changes the valence of the metal ions at the anode enabling the formation of insoluble salts or oxides which can be recovered from the pickle liquor by filtration.

DESCRIBED OFF THE PREFERRED EMBODIMENT

The method of the present invention is directed to purification of the pickle liquor of a galvanizing or metal cleaning plant after it has been contaminated. Pickle liquor is that batch of fluid which is normally used in pickling vats at a galvanizing or metal cleaning facility. It is customarily acid having a pH of about one, preferably sulfuric acid, though hydrochloric acid is also used. The pickle liquor is used to clean metal plates prior to or after galvanizing or plating. In either case, the acid is used until it becomes contaminated and loses its effectiveness, either from contamination or solution of metal products which tie up the ions in the acid solution. The acid becomes contaminated or loaded with metal ions, and becomes unuseable. The pickle liquor is cleaned, purified, and can be re-used in accordance with the teachings of the present invention.

The method of the present invention contemplates placing an anode and a cathode in the acid container and passing a current through the liquid to purify the acid by removal of the metal ions and metal complexes which are picked up by the acid. The method further contemplates the collection of pure metal products at the cathode as will be described. The method of the present invention bears some resemblance to electrolysis or electroplating, but this resemblance is only superficial. The method contemplates the use of an anode and cathode which are adapted to be placed in the vessel which receives the pickle liquor. The method further contemplates the use of a magnet, electromagnet, or permanent magnet in the near vicinity of the cathode. The cathode is preferably fully emersed in the tank with the pickle liquor surrounding the cathode on all sides except for an overhead support member which extends from above the tank into the tank to support the cathode. In the near vicinity of the overhead support rod, a magnet is positioned, preferably above the surface of the tank. In the preferred arrangement, the electrode is positioned below the surface of the liquid, but may extend toward the surface and be only slightly beneath the surface. The exact location or position is not critical, and the cathode may extend above the surface if desired. The magnet is positioned in near proximity to the cathode, typically immediately thereabove, and just an inch or so above the surface of the pickle liquor. The level of liquid in the container may rise or fall, and the magnet may be raised or lowered in position, depending on the level of the liquid in the container.

It is found in practice that the predominately iron metallic particle separates from the cathode as nacent metal, immediately starting to return into solution, thereby evolving a gas, This gas, together with the hydrogen formed at the cathode, sweeps the metallic particle upwards to the surface of the liquid, allowing its removal by magnetic attraction.

The use of a filtration system is further contemplated, and it must be adapted to handle acids as strong as those generally used in galvanizing plants. Such filtrations systems are readily available, and are different from conventional filtration systems only in that the components are lined with glass or plastic materials which are not attacked by the acids being filtered. The filter elements may be fiber glass screens or the like for the purpose of removing impurities from the acid as will be described.

The method of the present invention contemplates the passage of a DC current between the electrodes in the pickle liquor. The amperage of the current is subject to variation, dependent on the spacing of the electrode plates, extent of impurities, frequency at which the pickle liquor is purified, and many other factors. The current can be reduced toward a minimum, but this slows or impedes the purification process. The current can be increased, and is essentially limited by the heating of the anode or cathode, by the turbulence in the pickle liquor in the immediate vicinity of the electrode, and by other practical factors which sometimes must be determined depending upon the physical characteristics of the equipment used. The current flows between the electrodes for an indefinite period of time while the purification process of the present invention is practiced. Once the pickle liquor has been purified to a desired level, the process may be terminated. The desired level of purification is subject to variation, and the method of the present invention can be used to remove substantially all of the impurities in the pickle liquor.

For purposes of description, it will be assumed that the pickle liquor has accumulated various metal ions of soluble salts, including metallic elements such as iron, zinc, manganese, copper, chromium, titanium, nickel, lead, tin, molybdenum, strontium, and small quantities of other metals. The predominate metal ions are ferric and zinc ions. These metal ions are assumed to be in an acid typically having a pH in the range of one, where the iron concentration might range as high as seven to nine percent. The concentration of other metal ions is typically much smaller than the iron concentration, and may range as small as several hundredths of one percent.

When the DC current is passed through the solution, it has been discovered that the iron in the solution collects and adheres momentarily to the cathode. The iron adheres in a manner different from plating. It adheres somewhat in granular fashion, forming small whiskers on the surface of the cathode. The DC current passing through the cathode liberates elemental hydrogen in the vicinity of the cathode which collects against the cathode in the form of small bubbles. As these bubbles collect on the surface, they intermingle among the iron particles. The bubbles of hydrogen break free and float toward the surface, and the turbulence of their breaking free and floating upward breaks the iron particles free from the surface of the cathode. The iron particles are quite small, and move upwardly momentarily with the drift of the bubbles of hydrogen, and in their own gasses of liberation as they start resolution. As the iron particles near the surface, they are attracted by the magnet which is situated near the cathode, and are drawn to the magnet for collection.

A substantial portion of the iron, can be readily collected by the magnetic collection process. Collection of iron in this process continues substantially as long as the electric current is passed through the solution. After substantial usage, and under certain circumstances, small quantities of the iron may remain attached to the cathode in the form of warts, trees, or flash plating as these terms are understood by those familiar with the plating art. However, the cathode is not "plated" in the conventional sense of the term as understood in the industry.

The composition of the materials collected at the magnet include molecules or iron, other iron complexes, and magnetic metal atoms such as chromium and nickel. By iron complex, reference is made to various forms of iron in combination. The several forms may differ, but include iron molecules which collect or join together in different arrangements.

The current flow through the vat forces some of the metals into insoluble compounds. For example, some ferric oxide and ferrous oxide are formed at the anode which can be removed by filtration. Other trace metal ions enter into insoluble oxides and can likewise be removed by filtration. The insoluble products recovered by filtration also include various insoluble metal ion sulfates or sulfites which are also recovered by filtration.

If a substantial amount of zinc is present in the acid and its removal is desired, preferably the cathode is formed of aluminum. Zinc will not plate onto the aluminum as that term is understood by those familiar with the electroplating art. The use of an aluminum cathode causes the zinc to form a relatively insoluble flaking plate on the cathode which can be recovered by mechanical removal on a more or less continuing basis.

The method of the present invention has been generally described, and the results of its operation set forth. The method contemplates the pasing of a DC current between electrodes in the contaminated acid and the purifying of the acid thereafter. Two preferred purification techniques include filtration of oxidized metallic ions or collection of metal particles by magnetic attraction in the near vicinity of the electrodes.

The scope of the present invention is determined by the claims which are appended hereto.

I claim:

1. A method of removing metallic ions from the liquor of a galvanizing and/or metal cleaning tank after it has been used and has a pH of strong acid comprising the steps of passing a DC current through a pair of spaced electrodes placed in the tank to form a metallic complex characterized by its mechanical freedom from the electrodes, and removing the complex from the liquor.

2. The method of claim 1 wherein elemental metals adhere temporarily to the cathode, and are freed from the cathode for collection in the vicinity of the cathode at the surface of the liquor.

3. The method of claim 2 wherein the liquor forms elemental metals and bubbles of hydrogen at the cathode and the bubbles break the metals free of the cathode and lift them momentarily toward the surface.

4. The method of claim 2 wherein a magnet in the vicinity of the cathode attracts the elemental metals from the liquor.

5. The method of claim 1 wherein insoluble metal oxides are formed at the anode, and the step of removal includes filtration of the insoluble metal oxides from the liquor.

6. The method of claim 5 wherein the liquor includes iron and the oxides include ferric oxide and ferrous oxide.

7. The method of claim 4 including the step of using an aluminum cathode.

8. The method of claim 7 wherein the aluminum cathode is maintained without zinc plating thereon from the galvanizing liquor.

References Cited

UNITED STATES PATENTS

| | | | |
|---|---|---|---|
| 558,052 | 4/1896 | Encke et al. | 204—114 X |
| 799,862 | 9/1905 | Meaker | 204—96 X |
| 966,025 | 8/1910 | Lautzenhiser et al. | 204—149 |
| 1,255,433 | 2/1918 | Laist et al. | 204—114 |
| 3,098,019 | 7/1963 | Pagel | 204—114 X |
| 3,347,786 | 10/1967 | Baer et al. | 204—149 X |
| 3,706,646 | 12/1972 | Gibson, Jr., et al. | 204—149 |

JOHN H. MACK, Primary Examiner

A. C. PRESCOTT, Assistant Examiner

U.S. Cl. X.R.

204—152